(12) United States Patent
Semama

(10) Patent No.: US 10,285,061 B2
(45) Date of Patent: May 7, 2019

(54) SYSTEM AND METHOD FOR DETECTING FRAUD IN TELEPHONY

(71) Applicant: StarHome Mach GmbH, Zurich (CH)

(72) Inventor: Michael Semama, Doar-Na Efraim (IL)

(73) Assignee: StarHome Mach GmbH, Zurich (CH)

( * ) Notice: Subject to any disclaimer, the term of this patent is extended or adjusted under 35 U.S.C. 154(b) by 0 days.

(21) Appl. No.: 16/036,972

(22) Filed: Jul. 17, 2018

(65) Prior Publication Data

US 2019/0021006 A1    Jan. 17, 2019

Related U.S. Application Data

(60) Provisional application No. 62/533,175, filed on Jul. 17, 2017.

(51) Int. Cl.
| | |
|---|---|
| *H04W 12/12* | (2009.01) |
| *H04W 4/16* | (2009.01) |
| *H04W 8/18* | (2009.01) |
| *H04W 8/02* | (2009.01) |
| *H04W 8/16* | (2009.01) |

(52) U.S. Cl.
CPC ............ *H04W 12/12* (2013.01); *H04W 4/16* (2013.01); *H04W 8/02* (2013.01); *H04W 8/16* (2013.01); *H04W 8/18* (2013.01)

(58) Field of Classification Search
CPC ......... H04W 4/16; H04W 12/12; H04W 8/02; H04W 8/16; H04W 8/18
See application file for complete search history.

(56) References Cited

U.S. PATENT DOCUMENTS

2007/0072587 A1*  3/2007  Della-Torre ........ H04L 63/1408
455/410

* cited by examiner

*Primary Examiner* — Julio R Perez

(57) ABSTRACT

A method of detecting telephony fraud in the case of a mobile telephony device roaming at a visited network, the visited network being other than a home network of said mobile telephony device, cross-network triggering being available between said visited network and said home network. The method comprises detecting a non-correlation between said cross-network triggering and activity of said mobile telephony device, testing to find out if profile manipulation has taken place of a profile of said mobile telephony device held at said visited network, and upon detecting that profile manipulation has taken place taking remedial action such as blocking current calls and overwriting the manipulated profile.

6 Claims, 7 Drawing Sheets

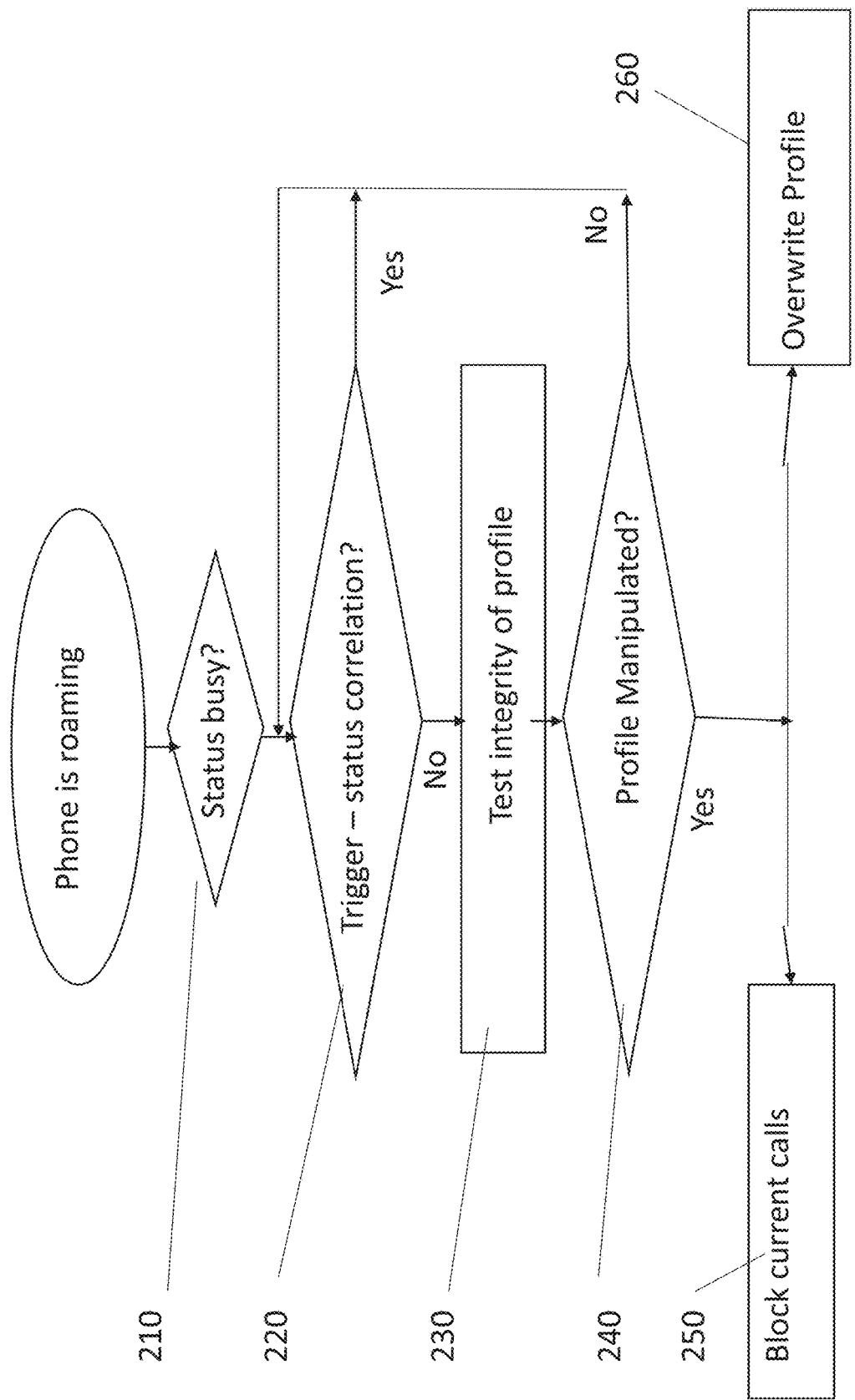

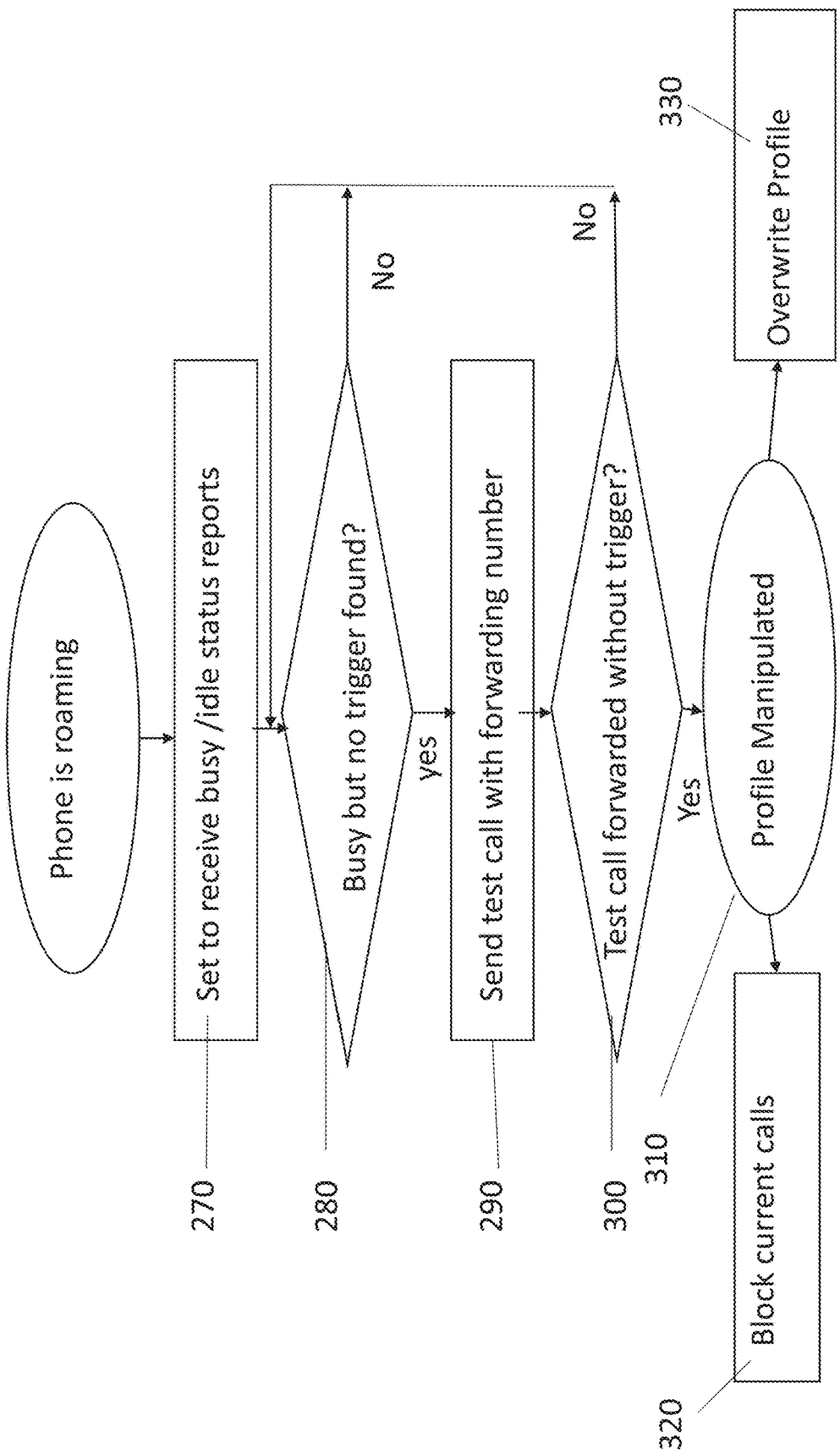

SYSTEM AND METHOD FOR DETECTING FRAUD IN TELEPHONY

RELATED APPLICATION

This application claims the benefit of priority under 35 USC § 119(e) of U.S. Provisional Patent Application No. 62/533,175 filed on Jul. 17, 2017, the contents of which are incorporated herein by reference in their entirety.

FIELD AND BACKGROUND OF THE INVENTION

The present invention, in some embodiments thereof, relates to a system and method for detecting fraudulent activity on telephony networks and, more particularly, but not exclusively, to detection of fraud that tries to take advantage of the seams between networks in the case of users roaming on a visited network which is different from their home network.

There are many possible ways in which telephony fraud may be carried out. Some of the mobile fraud scenarios involving SS7 hacking, i.e. sending SS7 messages, usually at the level of the MAP and CAMEL protocols. One of the fraud risks involves the removal of cross-network triggering, for example CAMEL triggers, from the subscriber profile. CAMEL is an inter-network protocol. When a subscriber is in roaming, and places a call (Mobile Originated—MO), then a trigger is sent from the serving MSC to the home network SCP, to allow control of the call. The home network may then either confirm or reject the call. The home network may act upon the trigger, for example to decide whether it is possible to activate real-time charging for prepaid users, the prepaid case being the most common usage for CAMEL.

CAMEL may also be used for fraud detection—for controlling calls to premium numbers for example, which are fraudulently placed without the knowledge of the subscriber.

Reference is now made to FIG. 1, which illustrates one of the ways a potential fraudster may act. The fraudster may act to remove the CAMEL triggers from the subscriber profile. This may for example be achieved by:

(1) obtaining the IMSI of the subscriber, by sending a query to the HLR with the subscriber MSISDN (the cellular number)—step 1, and (2) sending a fake subscriber profile—step 2—to the serving VLR (or VMSC), using the ISD MAP command and an SRI4SM (send routing information for short message). The attacker has the IMSI and knows the VMSC, and thus is able to send a MAP ISD or DSD signal to delete Camel from the profile. Specifically the information that is deleted may include the O-CSI (originating camel subscription information) Thus the CAMEL trigger is deleted from the profile of the unsuspecting users.

After the attacker has removed the CAMEL trigger, the home network no longer has real-time control for the calls made by its outbound roamers. Now, the fraudster may carry out the second phase of the fraud. One of the scenarios is shown with reference to FIG. 2.

Firstly, the attacker changes the FTN (forward To Number) of the subscriber in the subscriber profile, a number that is supposed to be used to forward calls to the subscriber's voicemail when the line is busy, but instead, the attacker changes the FTN to a premium number of the attacker's choice. Then, the attacker sends first 10 and second 15 PRN requests to the serving VLR, emulating the case of 2 consecutive MT calls for the subscriber. The attacker initiates a call 20 to MSRN1, the mobile temporary number allocated by the serving MSC as part of a normal call procedure. Then, after the subscriber answers the call, the attacker immediately initiates a second voice call 25 to the subscriber. Now, the subscriber status is busy as the subscriber is answering the first call, so this second call is forwarded 30 to the number defined as the FTN, supposedly the victim's voicemail but actually the attacker's premium number, all this without the knowledge of the subscriber. The second call remains connected to the premium number for as long as the attacker chooses, and the subscriber-victim ends up receiving the charges for a premium number he never called. No Camel triggers are sent so the home network does not detect that a premium number has been called.

ISD insert subscriber data is where the attacker inserts his premium number as the forward to on busy number.

Now it is not possible to find out at the home network where the call has been forwarded to in the above scenario. Even if it were possible it would not be possible to determine that certain forwarding numbers are suspicious and others not.

Furthermore it is not possible to conclude that fraud is taking place simply by determining that a Camel trigger is absent. Emergency calls for example quite legitimately do not generate Camel triggers, and thus blindly disconnecting all calls for which a CAMEL trigger has not been generated would forcibly terminate all emergency calls, which is clearly an unacceptable solution.

SUMMARY OF THE INVENTION

The present embodiments detect non-correlation between cross-network triggering of roaming devices on the one hand and network reports of the device status on the other hand, and then seek to find out if profile manipulation has taken place. In the event that profile manipulation has taken place, current calls may be terminated and the manipulated profile may be overwritten.

According to an aspect of some embodiments of the present invention there is provided apparatus at a home network for detecting telephony fraud on a roaming telephony device, the roaming telephony device being at a visited network, the fraud involving cancellation of cross-network trigger signals by modifying a profile of the roaming telephony device at the visited network, the apparatus comprising a control unit at the home network, the control unit configured to communicate with the visited network and set the visited network to monitor changes in state of the roaming device between an idle state and a busy state and issue corresponding state change signals, the control unit further configured to receive the state change signals from the visited network and correlate the state change signals with cross-network triggering for mobile originated calls obtained from the visited network, the control unit in an event of non-correlation further configured to carry out an action that normally causes a cross-network trigger to be issued, and if no further cross-network trigger is issued as a result of such an action to determine that the roaming device is being fraudulently manipulated.

In an embodiment, the control unit is configured to set the visited network to monitor the changes using a MAP—Set reporting state Signal, the MAP—set reporting state signal configuring the visited network to report on idle and busy states of the roaming telephony device.

In an embodiment, the action to normally cause a cross-network trigger to be issued comprises placing a call to the device, setting a forward-to-number beforehand, and causing the call to be forwarded to a pre-defined number and causing the VMSC to issue the cross-network trigger.

In an embodiment, the control unit is configured to block calls from the mobile telephony device if forwarding of the call to the forward to number is not accompanied by the further cross-network trigger, calls being allowed otherwise.

In an embodiment, the control unit is configured to rewrite the profile of the mobile telephony device at the visited network if forwarding of the call to the forward to number is not accompanied by the further cross-network trigger.

According to a second aspect of the present invention there is provided a method of detecting and taking action to prevent telephony fraud in the case of a mobile telephony device roaming at a visited network, the, cross-network triggering being available between the visited network and the home network to allow the home network control of the device, the method comprising:

detecting a non-correlation between the cross-network triggering and activity of the mobile telephony device;

upon the detecting of the non-correlation, testing to find out if profile manipulation has taken place of a profile of the mobile telephony device held at the visited network; and upon detecting that profile manipulation has taken place carrying out at least one member of the group of actions consisting of:

blocking current calls; and overwriting the manipulated profile.

In an embodiment, upon the detecting that profile manipulation has taken place, carrying out both members of the group of actions.

In an embodiment, the detecting a non-correlation comprises setting the visited network to provide a notification when the mobile telephony device transfers between an idle and a busy state, and upon receipt of a notification of a busy state, checking whether there is a corresponding trigger.

In the event of a mobile originated call, the method may check for the corresponding trigger from the visited network, and in the event of a mobile terminated call, may check for the corresponding trigger from the home network.

The detection of profile manipulation may involve setting a forward to number for the subscriber, sending a test call to the mobile telephony device while the mobile telephony device is in the engaged state, so that the test call is forwarded to the pre-defined number and the cross-network triggering is caused, and thus identifying the profile manipulation if a corresponding trigger is not detected.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a simplified flow chart showing a procedure for fraud suppression using the present embodiments;

FIG. 7 is a simplified flow chart showing an exemplary implementation of the fraud suppression of FIG. 6.

DESCRIPTION OF SPECIFIC EMBODIMENTS OF THE INVENTION

The present invention, in some embodiments thereof, relates to a system and method for detecting fraudulent activity on telephony networks and, more particularly, but not exclusively, to detection of fraud that tries to take advantage of the seams between networks in the case of users roaming on a visited network which is different from their home network.

Figure 1:
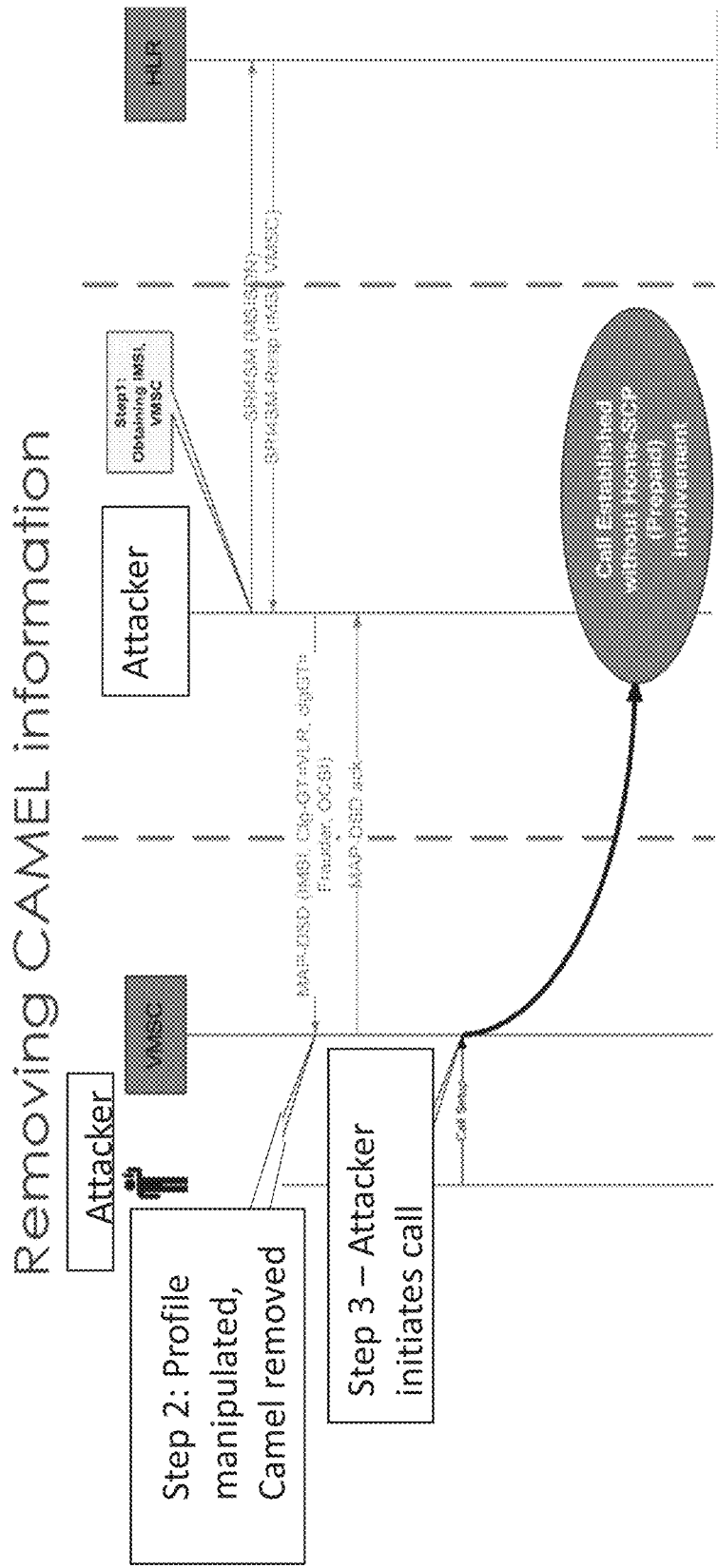
FIG. 1 is a simplified signal diagram showing steps an attacker may make in order to remove Camel triggering from a roaming mobile device.
Figure 2:
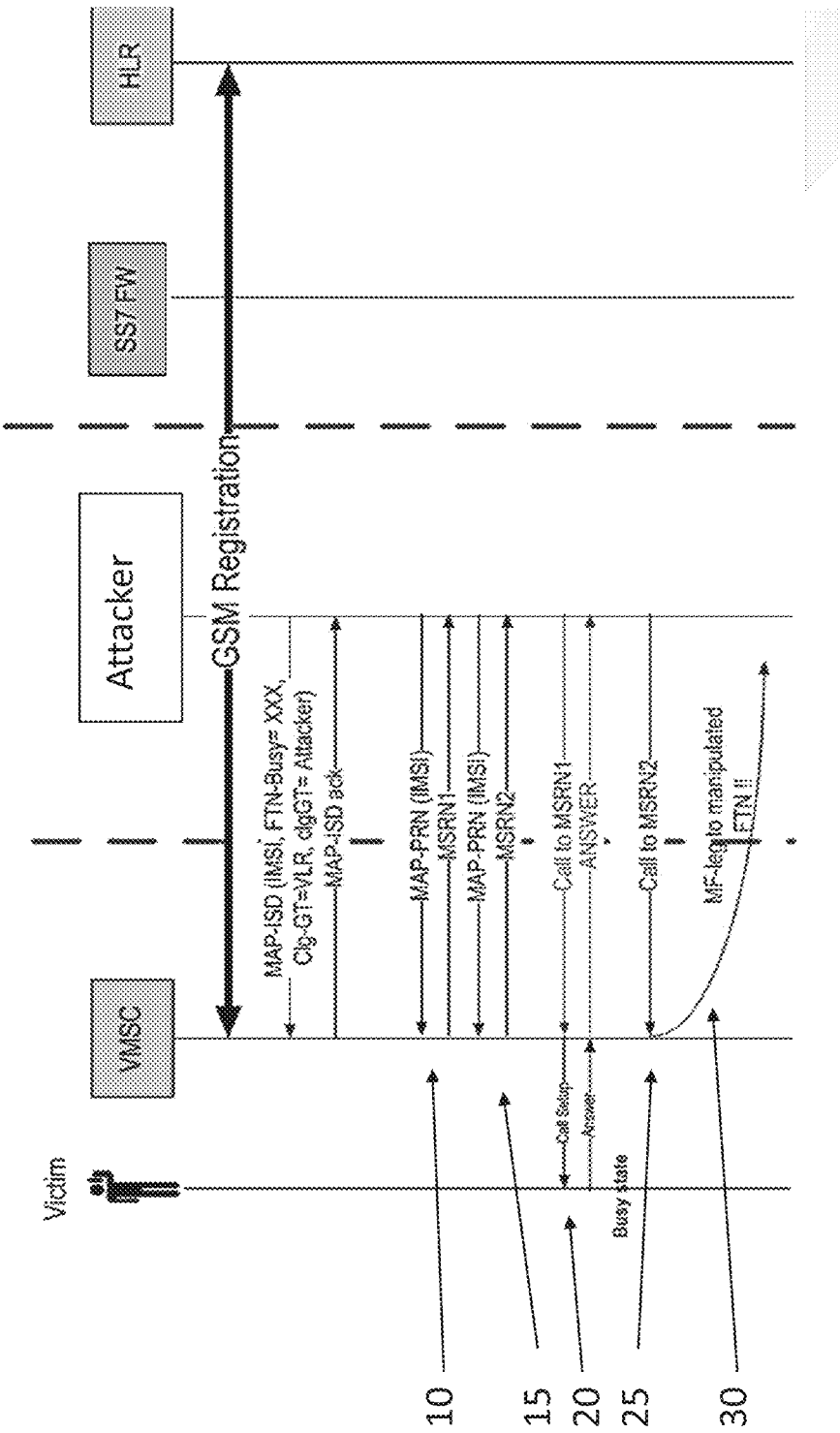
FIG. 2 is a simplified signal diagram showing steps an attacker may take in order to remove Camel triggering and introduce a fraudulent forward to number (FTN)

FIGS. 1 and 2 were discussed in the background and show exemplary attack scenarios of the kind that the present embodiments are intended to counter.

The present embodiments may provide a method of detecting telephony fraud in the case of a mobile telephony device roaming at a visited network, cross-network triggering such as Camel being available between the visited network and the home network. The method comprises detecting a non-correlation between the cross-network triggering and actual activity of the mobile telephony device. If such non-correlation is found, say the device is shown by the network to be busy but no Camel session has been set up by the triggers, then something suspicious is going on.

In embodiments the immediate remedial action may be taken at this point, say ending current calls and/or overwriting the profile at the roaming network. In other embodiments, testing may be carried out to find out if profile manipulation has actually taken place, and that the profile of the mobile telephony device held at the visited network has been changed. If the profile is found to have been manipulated then the same remedial action, including blocking current calls and overwriting the manipulated profile, may be carried out at this later point.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
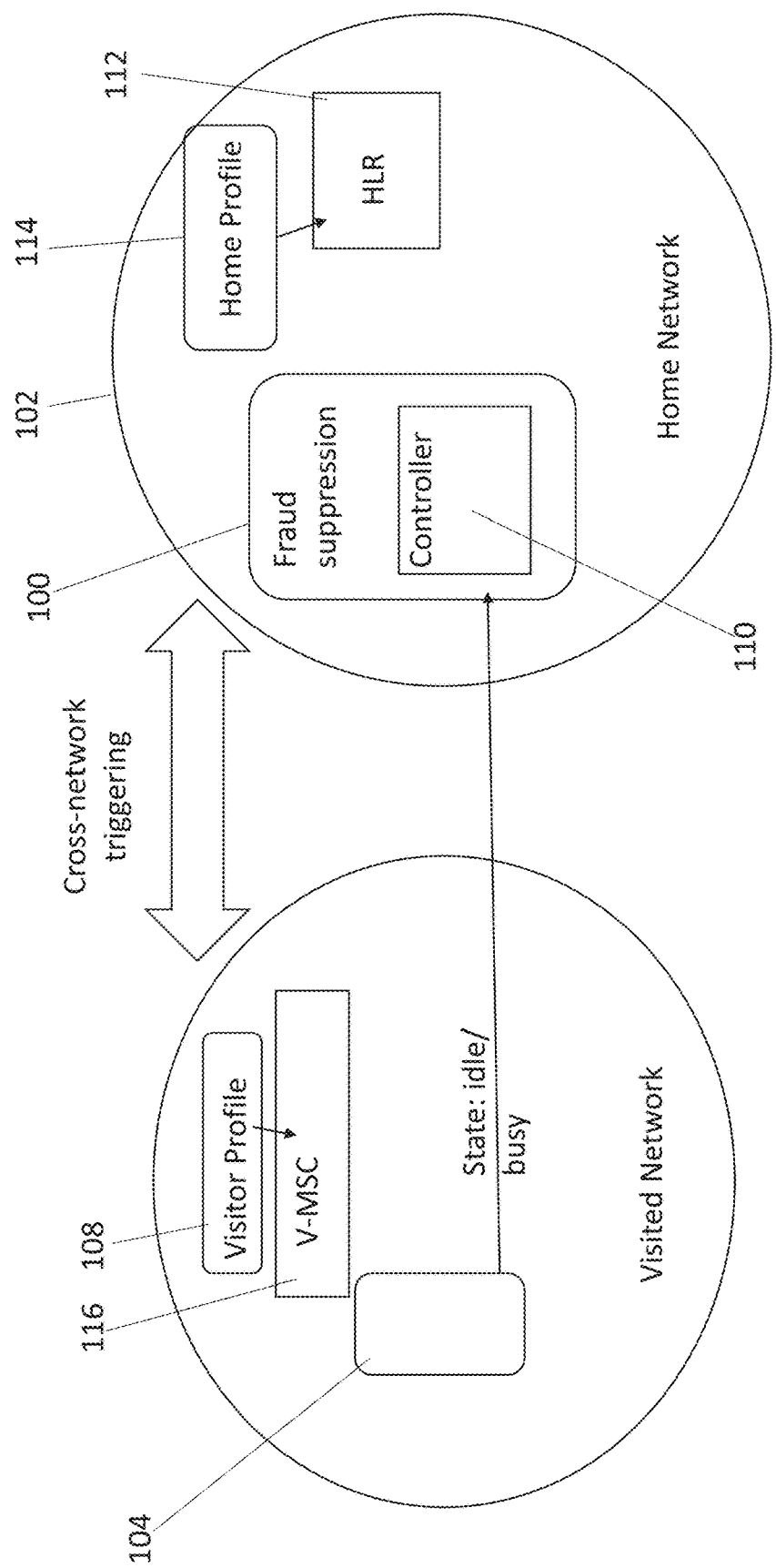
FIG. 3 is a block diagram showing a mobile device roaming on a visited network where roaming is supervised by fraud suppression apparatus of the present embodiments.

Referring now to the drawings, FIG. 3 illustrates a fraud suppression apparatus 100 at a home network 102 for detecting telephony fraud on a roaming telephony device 104. The roaming telephony device is registered on the home network 102 at home location register HLR 112 and is currently roaming at a visited network 106. The fraud is of the kind outlined in the background where cancellation of cross-network trigger signals is achieved by modifying the profile 108 of the roaming telephony device 104 at the visited network 106. The fraud may or may not additionally include changing the FTN. The profile 108 may be held at the VMSC (visited MSC) 116. Without modification the profile 108 is supposed to be a copy of the profile 114 at the home network 102. Control unit 110 communicates with the visited network 106 and sets the visited network to monitor changes in the state of the roaming device 104 between an idle state and a busy state and issue corresponding state change signals, so that the control unit receives a signal whenever the device 104 enters the busy state. The control unit thus receives the state change signals from the visited network and is able to correlate the state change signals with cross-network triggering which are being issued for roaming calls. Thus for outgoing calls from device 104, a cross-network trigger is obtained from the visited network. For incoming calls to device 104, the corresponding trigger comes from the network of the calling device and is available from the home network.

As long as a trigger is found then all is well and the operation of the device 104 is allowed to proceed as normal. However, in in the case of non-correlation, that is the device 104 has entered a busy state but no trigger has been issued for the call, the control unit now enters a procedure to test whether the profile at the visited network has in fact been manipulated. The controller 110 may carry out an action that normally causes a cross-network trigger to be issued. If such a cross-network trigger resulting from the action is detected then it may be assumed that the device 104 is operating normally, but if the action does not cause a trigger then it is apparent that the profile has been altered and it may be assumed that the roaming device 104 is being fraudulently manipulated.

Figure 4:
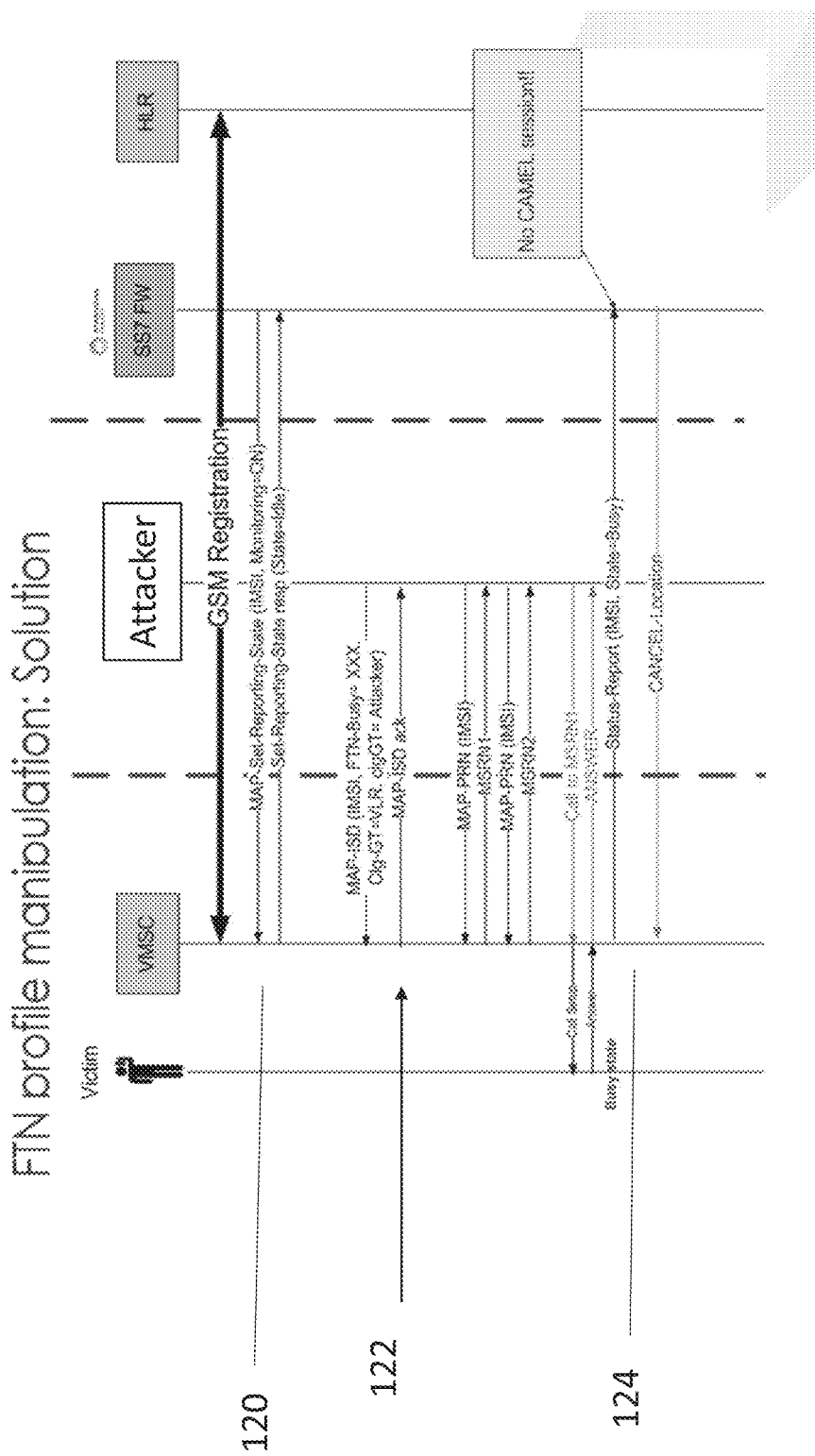
FIG. 4 is a simplified signal diagram showing how removal of Camel triggering and/or introduction of a fraudulent FTN may be defeated using fraud suppression according to the present embodiments.

Reference is now made to FIG. 4, which is a simplified signaling diagram showing exchange of signals between the victim's telephone, the VMSC of the visited network, the attacker, the home network HLR and the apparatus of the present embodiments, herein denoted SS7 FW. The control unit 110 sets the visited network to monitor the changes in state of the mobile device 104 using a MAP—Set reporting state Signal—120, so that the control unit 110 obtains an independent assessment of the state of the roaming device. The MAP—set reporting state signal may provide reports from the network infrastructure and thus the reports are independent of anything that may happen to the visited network profile.

Subsequently the attacker changes the profile of the mobile device—122—setting the forward to number FTN to a number of his choice as discussed above, and then the attacker makes the two calls, a first one to set the victim's device to busy and the second one to be forwarded to the fraudulent forward to number at the victim's expense.

At this point the visited network reports to the home network that the victim's device is in a busy state—124, but the controller fails to find any corresponding triggers. In one embodiment the victim's device is immediately closed down. In another embodiment, a test action is used to set up a trigger. For example, with the device still busy, a call is sent to the device. The call has a forward to number so the call is forwarded, and call forwarding normally causes a cross-network trigger to be issued. In the event that no such trigger is detected it may be concluded that the profile has been manipulated. The control unit may then, in the event of deciding that the profile has been manipulated, block calls from the mobile telephony device. Alternatively or additionally, the control unit 110 may rewrite the profile of the mobile telephony device at the visited network, typically by copying the home network version of the profile.

The cross-network triggers may be Camel triggers. The Camel triggers inform the home network that the roaming mobile device 104 is initiating a call, so that the home network can decide whether to allow the call, particularly for subscribers on prepaid-type contracts, so that a Camel session is set up. Thus the controller 110 may actually check whether there is a Camel session in progress.

Reference is now made to FIG. 6, which illustrates a method of detecting telephony fraud in the case of a mobile telephony device roaming at a visited network. Cross-network triggering, such as Camel triggering, is available between the visited network and the home network to allow the home network some control of the device. In the method, at some point the device at the roaming network is busy—210. The method involves detecting—220—a non-correlation between what the cross-network triggering says that the device status should be and what the actual status is, based on activity of the mobile telephony device on the visited network.

Upon detecting the non-correlation, the integrity of the profile is tested 230 to find out if profile manipulation has taken place—240. Thus the copy of the profile at the visited network may differ from the original profile at the home network.

Upon detecting that profile manipulation has taken place either or both of blocking current calls—250 and overwriting the manipulated profile—260—with the original profile may be carried out.

FIG. 7 is a simplified flow chart showing an implementation of the procedure of FIG. 6 according to embodiments of the present invention. Detecting a non-correlation may involve setting—270—the visited network to provide a notification when the mobile telephony device changes between an idle and a busy state. Upon receipt of a notification of a busy state, the controller then checks whether there is a corresponding trigger or Camel session in progress. If there is no such trigger or state, then preventative action such as blocking current calls 320 or overwriting the profile 330 may be taken on the assumption that the profile has been manipulated by an attacker.

However in other embodiments, further testing may be carried out, say to exclude the possibility that the user is engaged in an emergency call, which does not generate cross-network triggers. In such embodiments a test call is placed with the device—290—to the device while the device is still in busy mode. The test call includes a forwarding number so that since the device is in busy mode the call is forwarded—300. Forwarding of the call generates triggers, unless the profile has been manipulated. Thus if the test call is successfully forwarded but no sign is found of the trigger then it may be assumed that the profile has been manipulated—310. Then the remedial actions 320 and 330 may be entered into.

The present embodiments may prevent scenarios such as the one described above. The present embodiments may enable the home network 102 to determine that the subscriber profile has been manipulated by an attacker, and that the CAMEL trigger has been removed. As discussed, the embodiments may request that the visited network serving MSC (VMSC) operates the Set reporting State command for the subscriber IMSI. This feature, which is a standard MSC/VLR feature, sends a report whenever the subscriber status is changed from "idle" to "in call" or "busy", as well as other status reports.

Figure 5:
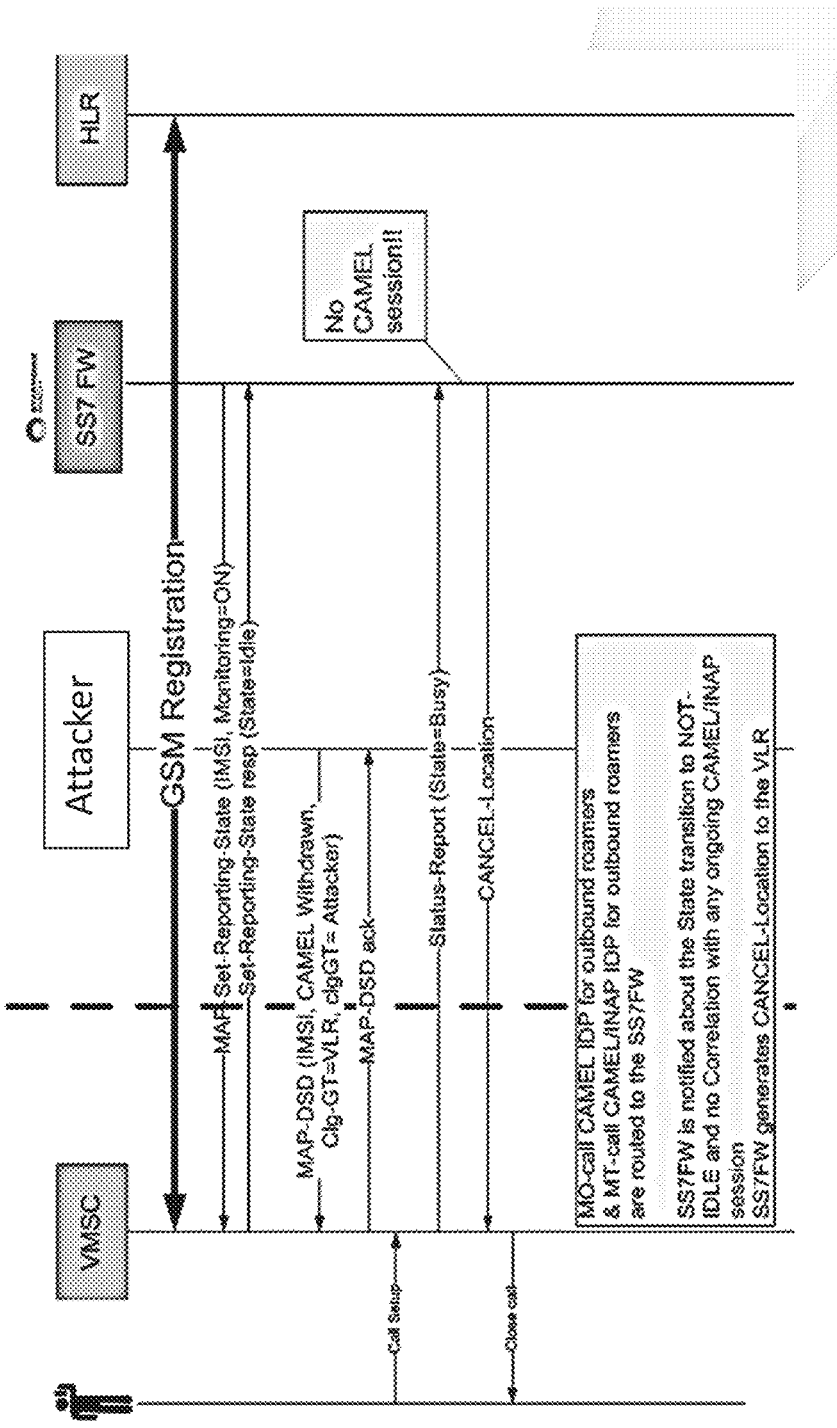
FIG. 5 is a simplified signal diagram showing how removal of Camel triggering may be defeated using fraud suppression according to the present embodiments.

FIG. 5 as discussed above shows a flow according to the present embodiments. The Set Reporting State is set and acknowledged, after which the MSC reports the "idle" status. Now, the attacker manipulates the profile, removes the CAMEL trigger and changes the FTN number as described above. However, as soon as the first of the two calls is placed, the MSC sends the "busy" report to the home network. The home network may now check the CAMEL log, and notices that there was no CAMEL trigger for that call, although the subscriber has CAMEL triggers in general, and each MT and MO call should be reported via CAMEL as well.

The conclusion is that the subscribe profile has been manipulated and the CAMEL triggers have been removed. The real-time action may be to block the current call and subsequent calls, since these are fraudulent calls, and to restore the subscriber profile CAMEL triggers and FTN numbers.

The solution is not limited to the above premium number type fraud, but is equally applicable to any CAMEL-based fraud scenario, which relies on removing the CAMEL triggers. As explained in the background, there is also the case of the mobile originating (MO) call, where an attacker, possibly the subscriber himself, removes the CAMEL triggers from the visited network profile in order to obtain free calls. The procedure and its defeat are shown in FIG. 5, where stage 120, setting the reporting state is the same as in FIG. 4. The activity by the attacker—122—is the same in that the Camel triggers are removed, but the FTN number is not changed. The detection and suppression 124 are the same.

As discussed, there is a Camel trigger for a terminating call, however it does not come from the visited network. Rather the trigger is stored in the subscriber profile at the HLR, and can be applied by the G-MSC (Gateway-MSC) of the home network, as the G-MSC controls of all MT calls (Mobile Terminated) calls that are directed to the subscriber.

It is noted that using a test call and seeing if forwarding generates a trigger is a way to identify that an emergency call is being made. As discussed, no CAMEL trigger is used or can be identified for emergency calls placed by the subscriber.

A test call may work as follows. When receiving a report of a busy status from the VMSC, a forward-to-number is added to a direct inward dialing number (DID), which is some number available to the controller. Then we call the subscriber, and allow the call to be forwarded to the DID, since the device is busy. Now forwarding of a call normally causes a trigger to be issued, so on forwarding one may check if such a trigger, a CAMEL trigger for the forward-to call, was issued. Direct inward dialing numbers (DIDs) are phone numbers that allow routing of calls to existing telephone lines. DIDs were developed in order to be able to assign certain employees a direct number, without requiring multiple physical phone lines.

It is expected that during the life of a patent maturing from this application many relevant cellular telephony protocols and switching procedures will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus at a home network for detecting telephony fraud on a roaming telephony device, the roaming telephony device being at a visited network, the fraud involving cancellation of cross-network trigger signals by modifying a profile of said roaming telephony device at said visited network, the apparatus comprising a control unit at the home network, the control unit configured to communicate with the visited network and set the visited network to monitor changes in state of the roaming device between an idle state and a busy state and issue corresponding state change signals, the control unit further configured to receive said state change signals from the visited network and correlate said state change signals with cross-network triggering for mobile originated calls obtained from the visited network, the control unit in an event of non-correlation further configured to carry out an action that normally causes a cross-network trigger to be issued, and if no further cross-network trigger is issued as a result of such an action to determine that the roaming device is being fraudulently manipulated, wherein said action to normally cause a cross-network trigger to be issued comprises placing a call to said roaming telephony device, setting a forward-to-number beforehand, causing the call to be forwarded to a pre-defined number and causing the VMSC to issue the cross-network trigger if the profile has not been modified.

2. Apparatus according to claim 1, wherein said control unit is configured to set the visited network to monitor said changes using a MAP-Set reporting state Signal, the MAP-set reporting state signal configuring the visited network to report on idle and busy states of said roaming telephony device.

3. Apparatus according to claim 1, wherein said control unit is configured to block calls from said mobile telephony device if forwarding of said call to said forward to number is not accompanied by said further cross-network trigger, calls being allowed otherwise.

4. Apparatus according to claim 3, wherein said control unit is configured to rewrite said profile of said mobile telephony device at said visited network if forwarding of said call to said forward to number is not accompanied by said further cross-network trigger.

5. A method of detecting telephony fraud in the case of a mobile telephony device roaming at a visited network, cross-network triggering being available between said visited network and said home network to allow said home network control of said device, the method comprising:
  detecting a non-correlation between said cross-network triggering and activity of said mobile telephony device, wherein said detecting a non-correlation comprises setting said visited network to provide a notification when said mobile telephony device transfers between an idle and a busy state, and upon receipt of a notification of a busy state, checking whether there is a corresponding trigger;
  in the event of a mobile originated call, checking for said corresponding trigger from said visited network, and in the event of a mobile terminated call, checking for said corresponding trigger from the home network;
  upon said detecting of said non-correlation, testing to find out if profile manipulation has taken place of a profile of said mobile telephony device held at said visited network; and
  upon detecting that profile manipulation has taken place carrying out at least one member of the group of actions consisting of:
  blocking current calls; and
  overwriting said manipulated profile;
  wherein said method further comprises setting a forward to number for the subscriber;
  sending a test call to said mobile telephony device while said mobile telephony device is in said engaged state, so that said test call is forwarded to the pre-defined number to cause said cross-network triggering; and
  determining that said profile manipulation has occurred if a corresponding trigger is not detected.

6. The method of claim 5, wherein upon said detecting that profile manipulation has taken place, carrying out both members of said group of actions.

* * * * *